Feb. 7, 1939.    W. J. HAWKINS ET AL    2,146,428

OVEN

Filed Jan. 7, 1937

W. J. HAWKINS &
F. J. BROWNELL
INVENTORS

BY Henry J. Savage
ATTORNEY

UNITED STATES PATENT OFFICE 2,146,428

OVEN

Wilford Judson Hawkins, Claiborne, Md., and Frederick J. Brownell, Queens Village, N. Y., assignors to National Biscuit Company, New York, N. Y., a corporation of New Jersey Application January 7, 1937, Serial No. 119,376

9 Claims. (Cl. 107—57)

Our invention relates to ovens and particularly to band ovens wherein an endless metal band passes over drums at the opposite ends of the oven and the articles to be baked, dried or otherwise heat treated are fed to its upper run at one end of the oven, carried through the oven on the band, and discharged at the opposite end. Such bands are made from sheet metal which must be thin enough to bend around the drums without undue stress in the metal. This type of oven has proven very satisfactory for baking many articles, including some bakery products, but heretofore has not been entirely successful for baking sponge goods and the like which require a large amount of heat during the initial part of the baking operation in order to effect the spring or puffing of the dough. This is because the metal of the bands is so thin that insufficient heat is stored in it and heat cannot be transmitted through it fast enough from the source (as gas burners) to supply the amount that is required initially. These band ovens are much more efficient, cost less to construct and maintain than other types of ovens and have come into quite extensive use where the goods are of such nature that they can be baked on thin metal. Attempts have been made to increase the thickness of the bands so that it will have sufficient residual heat to produce the initial heating or springing of sponge goods, but this makes the band very expensive and the drums have to be so large as to be impracticable.

The principal object of the present invention, therefore, is to provide a band oven having means for supplying a large amount of heat at the initial part of the band or during the initial part of the baking operation without increasing the thickness of the band.

Another object is to provide a heat storage means adjacent the initial end of a band oven arranged to give up its stored heat to the band, either by direct contact or by radiation, so that products on the band will receive a maximum amount of heat during the first part of the baking operation.

Another object is to provide a band oven wherein the thickness of the metal, and hence the amount of available heat, will be greatest at the initial or charging end of the band.

The above and other objects of the invention that will be suggested to those skilled in this art are attained by the embodiments thereof illustrated in the accompanying drawing wherein.

Figure 1:
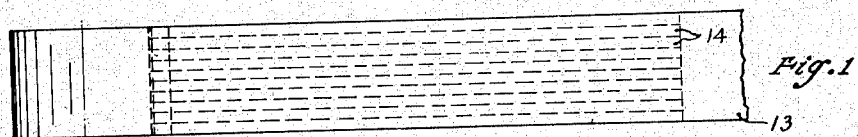
Fig. 1 is a section through the feeding or charging end of the band of a band oven wherein the effective thickness of the first part of the band is increased by a number of metallic shoes that bear on its under side.
Figure 2:
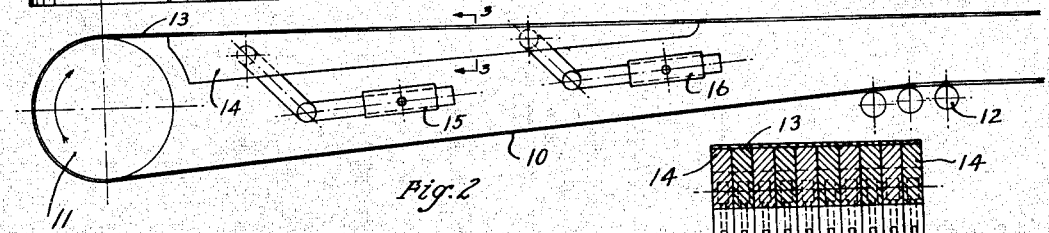
Fig. 2 is a top plan view thereof.
Figure 3:
Fig. 3 is a section taken substantially on the line 3—3 of Fig. 1.

Referring to the drawing we have illustrated in Figs. 1 to 3, the charging end of a band oven wherein the metal band 10 passes around a drum 11, the lower run of the band being supported by rollers 12 to prevent its sagging too low and the upper run 13 being adapted to receive the articles to be baked or other materials to be heat treated, the direction of travel of the upper run of the band being from left to right in Fig. 2.

A number of metal shoes 14 are yieldingly supported by counterweights 15, 16 beneath the initial part of the upper run 13 and are pressed into contact with it by the counterweights. These shoes are heated by gas burners, oil burners, or other heat supplying means not illustrated and since they are relatively thick as compared with the thickness of the band 10 they will have a large amount of heat stored in them which they will give up to the articles on the band during the initial part of the baking operation.

Figure 4:
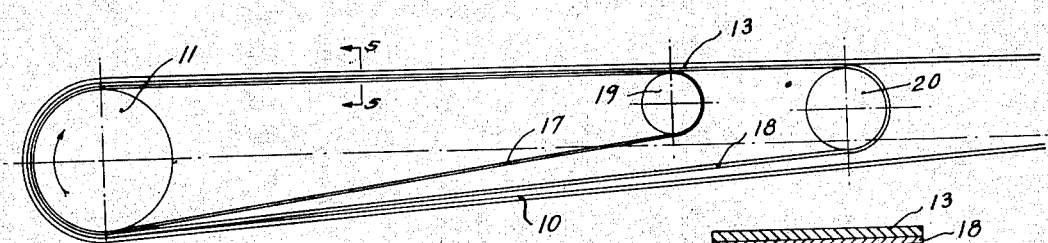
Fig. 4 shows a modified construction wherein the effective thickness of the band is increased by a number of auxiliary bands running in contact with it.
Figure 5:
Fig. 5 is a section taken on line 5—5 of Fig. 4.

In Figs. 4 and 5 we show two auxiliary bands 17, 18 within the band 10, the upper run of the band 18 being in contact and parallel to the upper run 13 of the baking band. The upper run of the band 17 likewise is parallel to and in contact with the upper run of the band 18. This gives a thickness of metal at the initial part of the upper run of the band equal to the thickness of the three bands. These bands are of course heated by gas burners or other suitable means.

All three bands pass around the drum 11 and the band 17 likewise passes around an auxiliary drum 19 while the band 18 passes around a similar auxiliary drum 20. All three bands may be driven from the drum 11. With this construction the rates of travel of the upper runs of the three bands will not be exactly equal because of their different distances from the center of the drum 11 so that there will be a slight slippage or creeping of the bands relative to each other on their upper run but we have found this to be desirable because this slight slippage keeps the metal of the bands polished and in good heat conducting contact.

Figure 6:
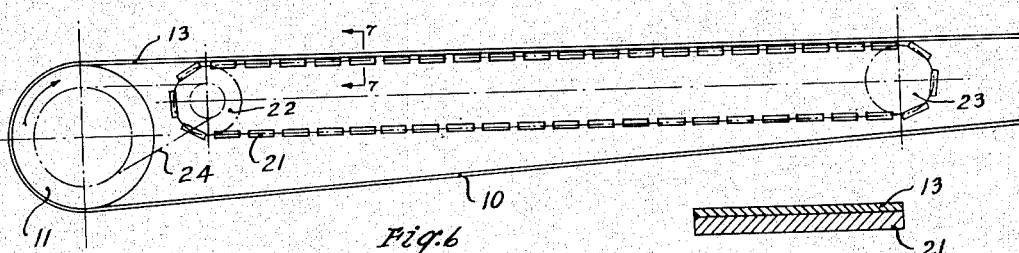
Fig. 6 shows a further modification wherein a number of relatively heavy metal blocks or other material of high heat capacity mounted on an endless chain run in contact with the initial part of the upper run of the band.
Figure 7:
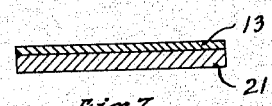
Fig. 7 is a section taken on line 7—7 of Fig. 6.

In Figs. 6 and 7 we have shown a further modification wherein blocks 21 of metal or other material having a high heat capacity are connected to form an endless chain passing over the drums or sprockets 22, 23 and driven by a chain or belt 24 from the same shaft as the drum 11. The blocks 21 on their upper run pass either in contact with or very close to the upper run 13 of the band 18 and impart their heat to the band and the articles on it during the initial part of the baking operation. If the blocks 21 are of metal they preferably will run in contact with and at the same speed as the upper run 13 of the band, while if they are made of refractory material and are heated to incandescence they will be spaced slightly from the upper run of the band and impart their heat to it by direct radiation rather than by conduction. The blocks 13 will of course be heated by gas burners or other suitable means.

Figure 8:
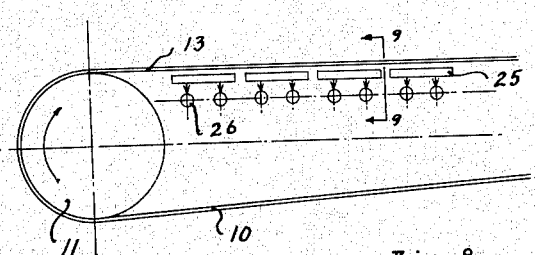
Fig. 8 shows a still further modification wherein the initial heat is furnished by radiation from blocks of refractory material or other radiant heating elements that are heated to incandescence.
Figure 9:
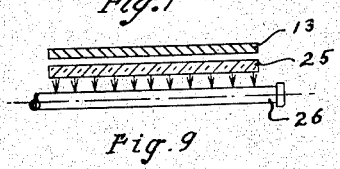
Fig. 9 is a section taken on the line 9—9 of Fig. 8.

In Figs. 8 and 9 we have illustrated another form of the invention wherein the initial part of the upper run of the band 13 receives additional heat from radiant heating elements 25 which may be blocks of refractory material that are heated by gas burners 26 or other suitable means. These blocks of refractory material are heated to incandescence and are spaced slightly from the upper run of the band so that they impart their heat to it by direct radiation.

While we have illustrated and described several forms which our invention make take it is to be understood that these are but illustrative of the invention and that it may be embodied in many other forms within the scope of our claims.

What we claim is:

1. In an oven of the endless band type, the combination of an endless metal band having upper and lower runs, the metal being of insufficient thickness to store sufficient heat for the initial part of the baking, the upper run being adapted to receive articles to be baked at one end, a metallic mass having a high heat capacity near the receiving end of the band, and means for maintaining said metallic mass in heat conductivity with the lower side of said upper run only adjacent its receiving end.

2. In an oven of the endless band type, the combination of an endless metal band having upper and lower runs, the metal being of insufficient thickness to store sufficient heat for the initial part of the baking, the upper run being adapted to receive articles to be baked at one end, a mass of material of high heat capacity located below the receiving end only of said upper run in heat transmitting relation thereto, whereby the receiving end of the band will receive a greater quantity of heat than the remainder thereof.

3. In an oven of the endless band type, the combination of an endless metal band, a metal shoe of greater thickness than the band supported below the upper run thereof, and means for pressing said shoe against the under side of said upper run adjacent the receiving end thereof.

4. In an oven of the endless band type, the combination of an endless metal band having upper and lower runs, the upper run being adapted to receive articles to be baked at one end thereof, a number of metal shoes of greater thickness than the band supported beneath said upper run, and means for yieldingly urging said shoes into contact with the under side of the band adjacent its receiving end.

5. In an oven of the endless band type, the combination of an endless metal band having upper and lower runs, a drum about which said band passes at one end, an auxiliary drum between the runs of said band and adjacent said first named drum, and a second endless band passing around said drums within said first band, the top of the upper run of said second band being in contact with and parallel to the under side of the upper run of said first band.

6. In an oven of the endless band type, the combination of an endless sheet metal band having upper and lower runs, the band being of insufficient thickness to store sufficient heat for the initial part of the baking, refractory material positioned between the two runs of said band adjacent only to the receiving end of the upper run but spaced slightly therefrom, and means to heat said refractory material to incandescence whereby it will heat the receiving end of said band by radiation.

7. In an oven of the endless band type, the combination of an endless metal band of uniform thickness having upper and lower runs, the upper run at one end being adapted to receive articles to be baked and deliver them at the other end, the band being of insufficient thickness to store sufficient heat for the initial part of the baking, and means adjacent the receiving end only of the band of large heat capacity relative to the band for receiving heat and transmitting it to the receiving end of the band thereby increasing the amount of heat available in the band during the initial part of the baking.

8. In an oven of the endless band type, the combination of an endless metal band of uniform thickness having upper and lower runs, the upper run being adapted to receive articles at one end and discharge them at the other, the band being of insufficient thickness to store sufficient heat for the initial part of the baking, and heat absorbing and storage means in heat transmitting relation to the underside of the upper run of the band adjacent only to its receiving end, whereby to increase the amount of stored heat available at the receiving end of the band equivalent to increasing the thickness of the band.

9. In an oven of the endless band type, the combination of an endless metal band having upper and lower runs, the upper run being adapted to receive articles at one end and discharge them at the other end, means for driving the band, and heat absorbing and transmitting means between the two runs of the band adjacent the receiving end thereof and in heat transmitting relation thereto, and means for moving said heat absorbing means along with the initial part of the upper run of the band.

WILFORD JUDSON HAWKINS.
FREDERICK J. BROWNELL.